(12) United States Patent
Villette et al.

(10) Patent No.: US 12,006,259 B2
(45) Date of Patent: Jun. 11, 2024

(54) ULTRA-HIGH-MOLECULAR-WEIGHT POLYETHYLENE CONCRETE REINFORCING BAR

(71) Applicant: Saudi Arabian Oil Company, Dhahran (SA)

(72) Inventors: Thibault Villette, Belfort (FR); Waleed Al Nasser, Dhahran (SA); Traidia Abderrazak, Dhahran (SA); Abdullah A. Al Shahrani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 647 days.

(21) Appl. No.: 17/095,871

(22) Filed: Nov. 12, 2020

(65) Prior Publication Data

US 2022/0144701 A1 May 12, 2022

(51) Int. Cl.
*C04B 16/06* (2006.01)
*C04B 111/00* (2006.01)
*C08J 5/04* (2006.01)
*E04C 5/07* (2006.01)

(52) U.S. Cl.
CPC ........... *C04B 16/0625* (2013.01); *C08J 5/046* (2013.01); *E04C 5/07* (2013.01); *C04B 2111/00379* (2013.01); *C08J 2323/06* (2013.01)

(58) Field of Classification Search
CPC ................ C08J 2323/06; C08J 5/046; C04B 2111/00379; C04B 16/0625; E04C 5/07; B32B 1/06; B32B 1/08; B29D 22/00; B29D 23/00; B21C 3/00; B29C 67/00
USPC .......... 428/371, 35.7, 398; 156/80; 425/114; 264/136
See application file for complete search history.

(56) References Cited

U.S. PATENT DOCUMENTS

| 5,580,642 | A | 12/1996 | Okamoto et al. |
| 5,843,266 | A | 12/1998 | Greenwood |
| 6,612,085 | B2 | 9/2003 | Edwards et al. |
| 2002/0031664 | A1* | 3/2002 | Kaiser ............ E04C 5/03 425/114 |
| 2004/0009338 | A1 | 1/2004 | Jo et al. |

FOREIGN PATENT DOCUMENTS

| CN | 101611205 A | 12/2009 |
| CN | 103819155 A | 5/2014 |
| DE | 102016111176 A1 | 12/2016 |

(Continued)

OTHER PUBLICATIONS

Al-Neshawy, "Reinforcing steel and composite materials", Aalto University School of Engineering, CIV-E1010 Building Materials Technology (5 cr), pp. 1-20, Sep. 12, 2016.

(Continued)

*Primary Examiner* — Camie S Thompson
(74) *Attorney, Agent, or Firm* — DINSMORE & SHOHL LLP (57) ABSTRACT

A reinforcing bar comprising a core is provided. The core comprises ultra-high-molecular-weight polyethylene fibers aligned in an axial direction and a polyethylene matrix. The ultra-high-molecular-weight polyethylene fibers are bound in the polyethylene matrix. A shell comprising ultra-high-molecular-weight polyethylene tape surrounds the core in a radial dimension.

20 Claims, 5 Drawing Sheets

(56) References Cited

FOREIGN PATENT DOCUMENTS

EP    3572594 A1    11/2019
WO    9815403 A1    4/1998

OTHER PUBLICATIONS

Chukov et al., "Comparison between self-reinforced composites based on ultra-high molecular weight polyethylene fibers and isotropic UHMWPE", Mendeleev Communications, vol. 30, pp. 49-51, 2020.
DSM Bright Science, "Ultra High Molecular Weight Polyethylene Fiber from DSM Dyneema", issued Jan. 1, 2016, pp. 1-4.
Peijs, "High Performance Polyethylene Fibers", Comprehensive Composite Materials II, Elsevier, pp. 86-126, Dec. 2017.
Teijin, "An ultra-strong performance film", https://www.teijinaramid.com/wp-content/uploads/2011/07/20003-Brochure-Endumax_LR.pdf; Endumax, 2011.
Notification of Transmittal of the International Search Report and the Written Opinion of the International Searching Authority, or the Declaration dated Mar. 16, 2022 pertaining to International application No. PCT/US2021/058885, filed Nov. 11, 2021, 12 pages.

\* cited by examiner

ULTRA-HIGH-MOLECULAR-WEIGHT POLYETHYLENE CONCRETE REINFORCING BAR

TECHNICAL FIELD

Embodiments of the present disclosure generally relate to concrete reinforcing bars and, more specifically, to ultra-high-molecular-weight polyethylene concrete reinforcing bars and a method of making ultra-high-molecular-weight polyethylene concrete reinforcing bars.

BACKGROUND

Concrete is an extensively used construction material. However, concrete on its own is not suitable for most construction projects. Although concrete has excellent resistance to compression, its tensile strength is poor. Thus, concrete is prone to cracking under tensile stress, which can lead to structural failure. To provide a concrete structure with both compressive and tensile strength, concrete is combined with reinforcing members to form reinforced concrete. The reinforcing members are embedded in the concrete and are generally either bars or fibers having a suitable tensile strength. Accordingly, in reinforced concrete, compressive loads are carried by the concrete and tensile loads are carried by the reinforcing members.

Fiber reinforced concrete provides a number of advantages over non-reinforced concrete. In fiber reinforced concrete, uniformly distributed and randomly oriented fibers (typically steel, glass, or synthetic fibers) are embedded in concrete. The fibers control cracking and provide some tensile strength to the composite. However, fiber reinforced concrete alone will not generally tolerate heavy loads under tension nor provide continuous reinforcement over long distances. Given the same reinforcing member material, reinforced concrete comprising reinforcing bars (rebar) achieves much greater tensile strength compared to fiber reinforced concrete due to the greater cross-sectional area and length of the reinforcing member.

Reinforced concrete comprising rebar is traditionally made by pouring concrete onto a pre-assembled lattice of rebar and allowing the concrete to harden. The most basic and inexpensive form of rebar is simple steel bars. Steel and concrete both have similar coefficients of thermal expansion. As such, reinforced concrete with embedded steel bars experiences minimal stress as a result of different expansions due to temperature change. While effective at boosting internal strength, plain steel rebar often corrodes as times goes on. As rust forms on the outside of the embedded rebar, it exerts an increasing amount of pressure on the surrounding concrete, which reduces the bonding strength. Such internal pressure can cause the concrete slab to spontaneously crack, while also making the concrete much more vulnerable to damage caused by blows and compressive forces. Thus, corrosion of the reinforcing member, such as rusting of steel rebar, can lead to structural failure.

SUMMARY

According to one embodiment, a reinforcing bar comprising a core is provided. The core comprises ultra-high-molecular-weight polyethylene (UHMWPE) fibers aligned in an axial direction and a polyethylene matrix. The UHMWPE fibers are bound in the polyethylene matrix. A shell comprising UHMWPE tape surrounds the core in a radial dimension.

According to another embodiment, a process for manufacturing one or more UHMWPE reinforcing bars is provided. The process includes aligning a plurality of UHMWPE fibers in an axial direction, partially melting the plurality of UHMWPE fibers by applying heat and pressure to the plurality of UHMWPE fibers. The process further includes cooling the plurality of UHMWPE fibers to form a core comprising the plurality of UHMWPE fibers and a UHMWPE matrix, where the plurality of UHMWPE fibers are bound in the UHMWPE matrix. The process further includes applying an UHMWPE tape to the surface of the core.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings.

DETAILED DESCRIPTION

Modifications to the composition of reinforcing bars (rebar) have been shown to reduce the risk of corrosion. For example, the addition of an epoxy-coating on plain steel rebar introduces a water-impermeable layer that offers some protection from corrosion. However, epoxy-coated rebar remains susceptible to corrosion if any gaps form in the coating. Stainless steel rebar are another alternative to mitigate corrosion. These are low carbon steel alloy bars and contain a minimum of 12% chromium and 8 to 12% nickel. Stainless steel bars are highly corrosive resistant and can be cast, pressed and machined. However, stainless steel rebar tend to be relatively costly compared to plain steel rebar. To overcome the aforementioned deficiencies, manufacturers have developed non-metallic rebar.

Non-metallic rebar generally comprise high strength fibers (i.e. glass, carbon or aramid fibers) set in a resin matrix. These fiber reinforced polymer (FRP) rebar generally have a higher strength to weight ratio than steel. However, existing FRP rebar have their own limitations. Glass FRP rebar can break down after prolonged exposure to concrete's highly alkaline environment and have a lower stiffness than steel. Aramid FRP rebar are susceptible to some chemicals including chlorine, which can limit their service life in many environments. Carbon FRP rebar feature excellent chemical resistance and tensile strength, but are expensive compared to alternatives.

Despite the available reinforcing bars, intense research activity in this field is still being conducted. There is a need for an inexpensive and chemically inert reinforcing bar with a high specific strength and specific stiffness. Embodiments provided herein meet this need through an ultra-high-molecular-weight polyethylene (UHMWPE) concrete reinforcing bar.

The present disclosure is directed to a reinforcing bar comprising a core. The core comprises UHMWPE fibers aligned in an axial direction and a polyethylene matrix. The UHMWPE fibers are bound in the polyethylene matrix. A shell comprising UHMWPE tape surrounds the core in a radial dimension.

Figure 1A:
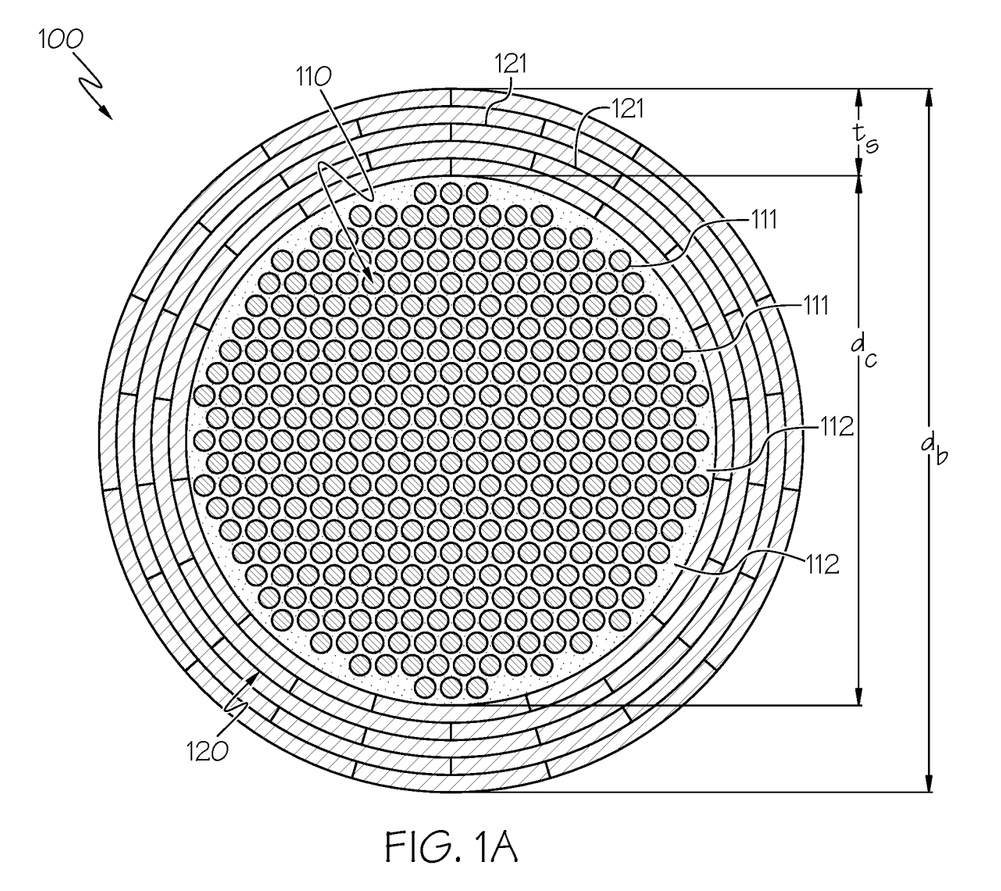
FIG. 1A schematically depicts a cross section of an ultra-high-molecular-weight based reinforcing bar, according to one or more embodiments described in this disclosure.
Figure 1B:
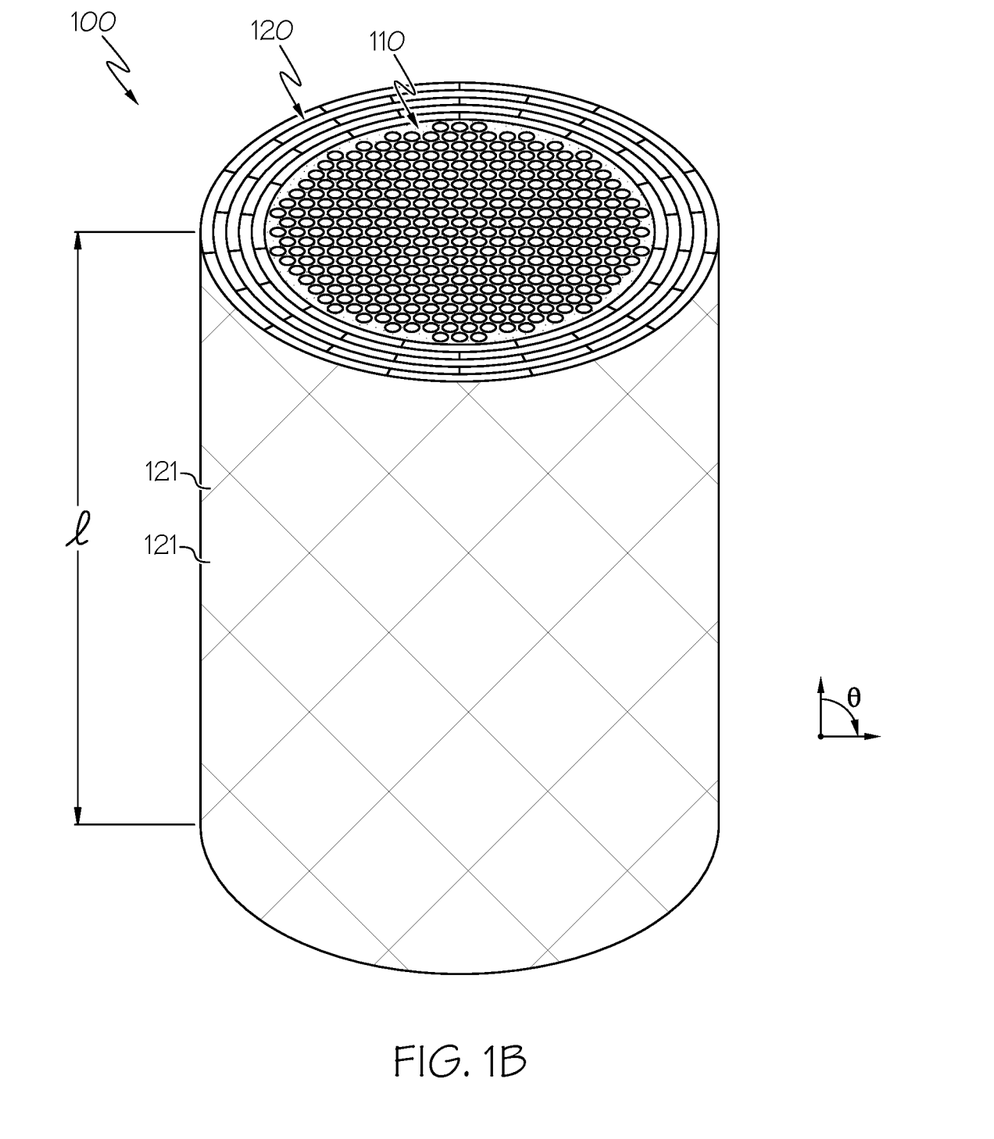
FIG. 1B schematically depicts a side view of an ultra-high-molecular-weight polyethylene concrete reinforcing bar, according to one or more embodiments described in this disclosure.

FIG. 1A shows a cross section of a reinforcing bar 100 with diameter $d_b$ according to embodiments. FIG. 1B shows a side view of reinforcing bar 100 according to embodiments. While the reinforcing bar 100 is depicted as cylindrical in the embodiments shown in FIG. 1A and FIG. 1B, other shapes are also contemplated. The reinforcing bar 100 comprises a core 110 with diameter $d_c$ surrounded by a shell 120 with thickness $t_s$. It is believed that the core 110 provides the bar with longitudinal stiffness while the shell 120 secures the core 110 and minimizes fiber debonding. The core 110 comprises UHMWPE fibers 111 bound in a polyethylene matrix 112. The shell 120 of embodiments depicted in FIG. 1A and FIG. 1B comprises multiple layers of UHMWPE tape 121. It should be understood that, according to embodiments, the shell section may comprise any number of UHMWPE tape layers 121.

According to one or more embodiments, the UHMWPE fibers 111 are aligned in the axial direction of the reinforcing bar 100. As such, each of the UHMWPE fibers 111 are oriented at about 0 degrees with respect to the axis of the reinforcing bar 100 and are substantially parallel to each other. As used in the preceding sentence, "about" and "substantially" are meant to include any manufacturing or engineering variances. Each of the UHMWPE fibers 111 may, according to embodiments, have a diameter between 1 micron and 100 microns, between 2 microns and 50 microns, or between 5 microns and 30 microns. The UHMWPE fibers 111 may extend the entire length of the reinforcing bar 100. As such, the UHMWPE fibers 111 may have a length/approximating the length/of reinforcing bar 100. According to embodiments, the UHMWPE fibers 111 may have a tensile strength of between 2.0 GPa and 6.0 GPa, between 2.5 GPa and 5.0 GPa, between 2.7 GPa and 4.5 GPa, or between 3.0 GPa and 4.0 GPa. In embodiments, the UHMWPE fibers 111 may have a Young's modulus of between 50 GPa and 200 GPa, between 60 GPa and 180 GPa, between 70 GPa and 160 GPa, between 80 GPa and 150 GPa, between 85 GPa and 140 GPa, or between 90 GPa and 135 GPa. In embodiments, the UHMWPE fibers 111 may have an elongation at break of between 1% and 7%, between 1.5% and 6%, between 2% and 5%, between 2.5% and 4.5%, or between 2.8% and 4.2%. In embodiments, the UHMWPE fibers 111 may be Dyneema® SK78, Dyneema® DM20, Spectra® 1000 fiber, Spectra® 600 fiber, or Endumax® fiber.

In embodiments, the shell section is formed by wrapping UHMWPE tape 121 continuously around the core 110. Accordingly, to increase the thickness is of the shell 120, a greater number of layers of UHMWPE tape 121 are applied around the core 110. Each layer of UHMWPE tape 121 may have a thickness of between 5 microns and 500 microns, between 10 microns and 200 microns, between 20 microns and 100 microns, between 40 microns and 80 microns, or between 45 microns and 75 microns. In embodiments, the UHMWPE tape 121 may have a tensile strength of between 1.0 GPa and 5.0 GPa, between 1.5 GPa and 4.5 GPa, between 2.0 GPa and 4.0 GPa, between 2.3 GPa and 3.5 GPa, or between 2.5 GPa and 3.0 GPa. In embodiments, the UHMWPE tape 121 may have a Young's modulus of between 80 GPa and 250 GPa, between 100 GPa and 230 GPa, between 120 GPa and 210 GPa, between 140 GPa and 200 GPa, between 150 GPa and 190 GPa, or between 160 GPa and 180 GPa. In embodiments, the UHMWPE tape 121 may have an elongation at break of between 0.2% and 5%, between 0.5% and 4%, between 1.0% and 3%, between 1.2% and 2.5%, or between 1.5% and 2.0%. In embodiments, the UHMWPE tape 121 is Endumax®, CHR® 2300, CHR® 2302, CHR® 2312, 3M™ tape 5421, 3M™ tape 5423, or 3M™ tape 5425.

According to one or more embodiments, the UHMWPE fibers 111 may have a tensile strength that is between 0.1 GPa and 2.0 GPa, between 0.3 GPa and 1.8 GPa, between 0.5 GPa and 1.6 GPa, between 0.7 GPa and 1.4 GPa, between 0.9 GPa and 1.3 GPa, or between 1.0 GPa and 1.2 GPa greater than the tensile strength of the UHMWPE tape 121. In embodiments, the UHMWPE fibers 111 may have an elongation at break that is between 0.1% and 5.0%, between 0.2% and 4%, between 0.5% and 3.0%, between 0.7% and 2.5%, between 0.8% and 2.0%, between 1.0% and 1.7%, between 1.1% and 1.5%, or between 1.2% and 1.4% greater than the UHMWPE tape 121. In embodiments, the UHMWPE fibers 111 may have a Young's modulus that is between 1.0 GPa and 100 GPa, between 5.0 GPa and 80 GPa, between 10 GPa and 60 GPa, between 20 GPa and 50 GPa, between 30 GPa and 45 GPa, between 35 GPa and 42 GPa, or between 37 GPa and 39 GPa less than the UHMWPE tape 121.

Referring now to FIG. 1B, the UHMWPE tape 121 plies may be alternatively laid at an angle +/−θ with respect to the axis of the reinforcing bar 100. In embodiments, the UHMWPE tape 121 may be oriented around the core 110 at an angle θ of between 1 degree and 89 degrees, between 5 degrees and 80 degrees, between 7 degrees and 70 degrees, between 10 degrees and 60 degrees, between 15 degrees and 50 degrees, or between 20 degrees and 40 degrees with respect to the axis of the reinforcing bar 100.

According to one or more embodiments, the diameter $d_b$ of the reinforcing bar 100, which is the total diameter of the reinforcing bar 100, is equal to the diameter $d_c$ of the core 110 plus two times the thickness is of the shell 120. The diameter $d_b$ of the reinforcing bar 100 may be at least 1 millimeter, at least 5 millimeters, at least 10 millimeters, at least 15 millimeters, or at least 20 millimeters.

A larger ratio of the diameter $d_c$ of the core 110 to the diameter $d_b$ of the reinforcing bar 100 ($d_c/d_b$) may provide the reinforcing bar 100 a greater Young's modulus and tensile strength, but may reduce the shear strength of the reinforcing bar 100. In embodiments, the ratio of the diameter $d_c$ of the core 110 to the diameter $d_b$ of the reinforcing bar 100 ($d_c/d_b$) may be between 0.4 and 0.99, between 0.5 and 0.99, between 0.6 and 0.99, between 0.7 and 0.99, between 0.8 and 0.99, between 0.9 and 0.99, between 0.95 and 0.99, or between 0.97 and 0.99.

A larger ratio of the thickness is of the shell 120 to the diameter $d_b$ of the reinforcing bar 100 ($t_s/d_b$) may provide the reinforcing bar 100 a greater shear strength, but may reduce the Young's modulus and tensile strength of the reinforcing bar 100. Without being bound by theory, shear strength may depend on the strength of the fiber-matrix interface. Therefore, a thicker shell may provide a more compressed and thus stronger fiber-matrix interface. In embodiments, the ratio of the thickness is of the shell 120 to the diameter $d_b$ of the reinforcing bar 100 ($t_s/d_b$) may be between 0.01 and 0.30, between 0.01 and 0.25, between 0.01 and 0.20, between 0.01 and 0.15, between 0.01 and 0.10, between 0.01 and 0.05, or between 0.01 and 0.03.

Referring again to FIG. 1, the polyethylene matrix 112 binds the UHMWPE fibers 111 together in the core 110. The polyethylene matrix 112 also binds the UHMWPE fibers 111 and the UHMWPE shell 120. The polyethylene matrix 112 may transfer stresses between UHMWPE fibers 111. In embodiments, the polyethylene matrix 112 comprises polyethylene. In embodiments, the polyethylene matrix 112 comprises UHMWPE. In embodiments, the polyethylene matrix 112 consists of UHMWPE. In embodiments where the fibers 111, the matrix 112, and the shell 120 are all made from UHMWPE, the reinforcing bar 100 consists of UHMWPE. In embodiments, the UHMWPE fibers 111 may comprise between 40% and 80%, between 50% and 80%, between 55% and 80%, between 60% and 80%, between 65% and 80%, or between 70% and 80% of the volume of the core 110. In embodiments, the polyethylene matrix 112 may comprise between 20% and 60%, between 20% and 50%, between 20% and 45%, between 20% and 40%, between 20% and 35%, or between 20% and 30% of the volume of the core 110.

Reinforcing bars according to embodiments described herein may have a Young's modulus of between 60 GPa and 130 GPa, between 70 GPa and 120 GPa, between 75 GPa and 115 GPa, between 80 GPa and 115 GPa, between 90 GPa and 110 GPa, between 95 GPa and 110 GPa, or between 100 GPa and 110 GPa. Reinforcing bars according to embodiments described herein may have a specific stiffness of between $60 \times 10^6$ $m^2$ $s^{-2}$ and $130 \times 10^6$ $m^2$ $s^{-2}$, between $70 \times 10^6$ $m^2$ $s^{-2}$ and $120 \times 10^6$ $m^2$ $s^{-2}$, between $75 \times 10^6$ $m^2$ $s^{-2}$ and $115 \times 10^6$ $m^2$ $s^{-2}$, between $80 \times 10^6$ $m^2$ $s^{-2}$ and $115 \times 10^6$ $m^2$ $s^{-2}$, between $90 \times 10^6$ $m^2$ $s^{-2}$ and $110 \times 10^6$ $m^2$ $s^{-2}$, between $95 \times 10^6$ $m^2$ $s^{-2}$ and $110 \times 10^6$ $m^2$ $s^{-2}$, or between $100 \times 10^6$ $m^2$ $s^{-2}$ and $110 \times 10^6$ $m^2$ $s^{-2}$.

Reinforcing bars according to embodiments described herein may have a tensile strength of between 1.3 GPa and 3.7 GPa, between 1.5 GPa and 3.5 GPa, between 1.7 GPa and 3.3 GPa, between 1.8 GPa and 3.0 GPa, between 1.9 GPa and 2.8 GPa, or between 2.0 and 2.5 GPa. Reinforcing bars according to embodiments described herein may have a specific strength of between 1,300 kN·m/kg and 3,700 kN·m/kg, between 1,500 kN·m/kg and 3,500 kN·m/kg, between 1,700 kN·m/kg and 3,300 kN·m/kg, between 1,800 kN·m/kg and 3,000 kN·m/kg, between 1,900 kN·m/kg and 2,800 kN·m/kg, or between 2,000 kN·m/kg and 2,500 kN·m/kg.

Reinforcing bars according to embodiments described herein may have a shear strength of between 0.10 GPa and 0.70 GPa, between 0.12 GPa and 0.60 GPa, between 0.14 GPa and 0.55 GPa, between 0.20 GPa and 0.50 GPa, between 0.30 GPa and 0.50 GPa, or between 0.35 GPa and 0.45 GPa. Reinforcing bars according to embodiments described herein may have an elongation at break of between 1.5% and 3.0%, between 1.6% and 2.9%, between 1.7% and 2.7%, between 1.8% and 2.5%, between 1.9% and 2.4%, or between 2.0% and 2.3%.

Figure 2:
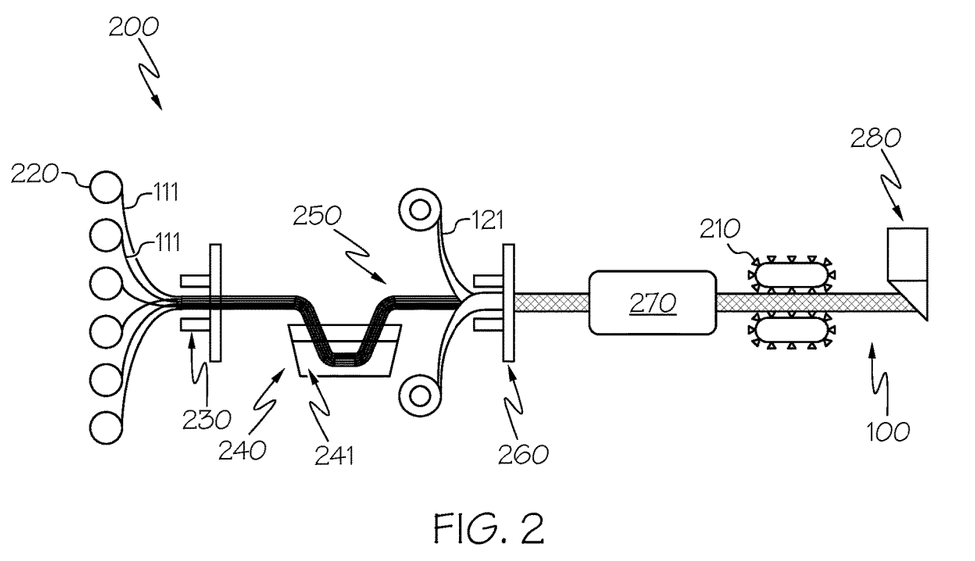
FIG. 2 schematically depicts a first process for making an ultra-high-molecular-weight polyethylene concrete reinforcing bar, according to one or more embodiments described in this disclosure.

In embodiments, and with reference now to FIG. 2, the reinforcing bar 100 may be manufactured using a first process 200. Embodiments of the first process 200 may be used to manufacture a reinforcing bar 100 with any suitable diameter $d_b$ and length 1. Through the action of pullers 210, the UHMWPE fibers 111 are continuously pulled from rovings 220, which are bundles of UHMWPE fiber 111. The number of rovings 220 may correspond to the number of UHMWPE fibers 111 in the core 110. The UHMWPE fibers 111 are aligned in parallel through first guide 230, and submerged in impregnation bath 240, which comprises polyethylene 241. Impregnation bath 240 may be heated to a temperature above the melting point of polyethylene 241 but below the melting point of the UHMWPE fibers 111. Polyethylene 241 may comprise any polyethylene thermoplastic material with a melting point between 70° C. and 140° C., between 80° C. and 135° C., or between 90° C. and 130° C.

The UHMWPE fibers 111 are impregnated with polyethylene 241 in impregnation bath 240. After being pulled out of impregnation bath 240, the polyethylene soaked fibers 250 cool, which causes polyethylene 241 to harden and bind the UHMWPE fibers 111 together and form a core 110. The core 110 is continuously wrapped in UHMWPE tape 121, which is applied by means of rotating tape dispensers. The layers of applied UHMWPE tape 121 make up the shell 120. The core 110 surrounded by shell 120 is pulled through second guide 260 to ensure proper alignment, and is compacted under heat in binding hot die 270, which molds the desired cross-sectional shape, binds the shell 120 to the core 110, and ensures that the reinforcing bar 100 is tightly bound. The resulting reinforcing bar 100 cools after exiting binding hot die 270 and is cut to the desired length using cutter 280.

In embodiments of the first process 200, binding hot die 270 may be may be heated to a temperature above the melting point of polyethylene 241 but below the melting point of the UHMWPE fibers 111. As such, in embodiments of the first process 200, binding hot die 270 may advantageously melt the polyethylene matrix 112 in the core 110 in order to mold the reinforcing bar 100 to the desired shape and bind the core 110 to the shell 120 without melting the UHMWPE fibers 111 or UHMWPE tape 121. Thus, in the first process 200, binding hot die 270 may be heated to between 70° C. and 140° C., between 80° C. and 135° C., or between 90° C. and 130° C.

In embodiments, the reinforcing bar 100 may consist of UHMWPE. In these embodiments, because the UHMWPE fibers 111 and the polyethylene matrix 112 both consist of the same polymer, the core 110 may be termed a self-reinforced composite (SRC). SRCs have many advantageous properties over traditional FRP composites. Namely, since the fibers and the matrix are the same material, SRCs have superior compatibility and interfacial interaction between the fibers and the matrix. Thus, fiber debonding is less likely in SRCs than in traditional FRP composites. Additionally, because SRCs consist of only one material, they may be highly recyclable. Recycling SRCs may be performed by heating the SRC to its melting point. In conventional FRP composites, the fibers and matrix must be separated for recycling to occur.

The work of Chukov (see e.g., Chukov et al., Comparison Between Self-Reinfoced Composites Based on Ultr-High Molecular Weight Polyethylene Fibers And Isotropic UHMWPE, 30 Mendeleev Commun. 49-51 (2020)) has demonstrated that UHMWPE SRCs, which may be unidirectional composites, have superior mechanical properties to isotropic UHMWPE (UHMWPE that is oriented equally in all directions). For example, UHMWPE SRCs were found to be over an order of magnitude better in creep than isotropic UHMWPE. Without being bound by theory, the high crystallinity and oriented structure of the UHMWPE fibers result in a lower creep rate than isotropic UHMWPE, which has more amorphous regions and thus weaker intermolecular forces.

Figure 3:
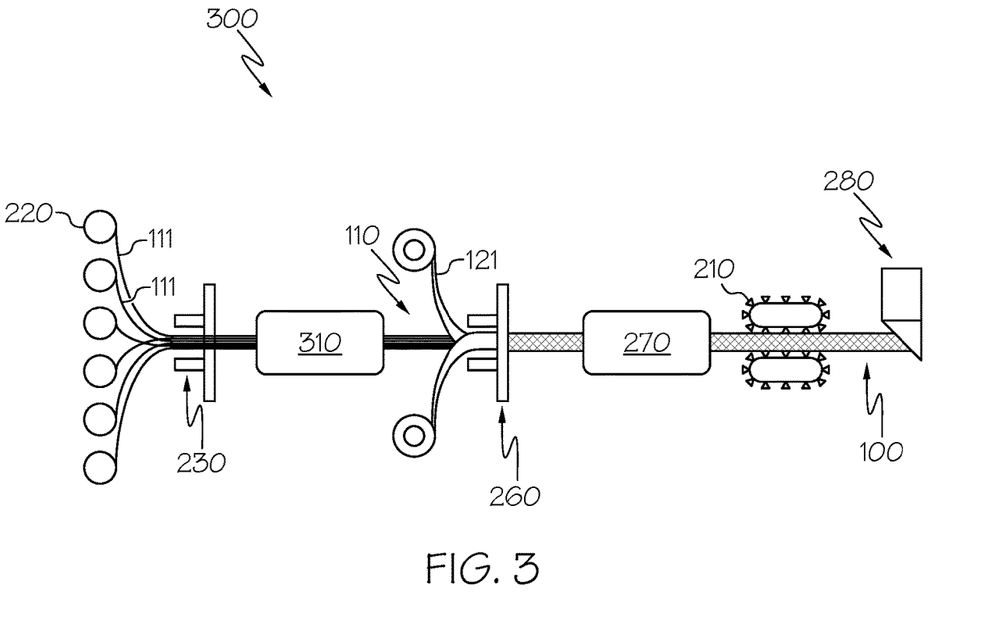
FIG. 3 schematically depicts a second process for making an ultra-high-molecular-weight polyethylene concrete reinforcing bar, according to one or more embodiments described in this disclosure.

With reference now to FIG. 3, a reinforcing bar 100 consisting of UHMWPE may be manufactured using a second process 300. Embodiments of the second process 300 may be used to manufacture a reinforcing bar 100 with any suitable diameter $d_b$ and length 1. Through the action of pullers 210, the UHMWPE fibers 111 are continuously pulled from rovings 220. The UHMWPE fibers 111 are aligned in parallel through first guide 230 before being subjected to the action of initial hot die 310. In initial hot die 310, the UHMWPE fibers 111 undergo self-reinforcing step 400 to form a self-reinforced core 110. The self-reinforcing step 400 is depicted in FIG. 4.

Figure 4:
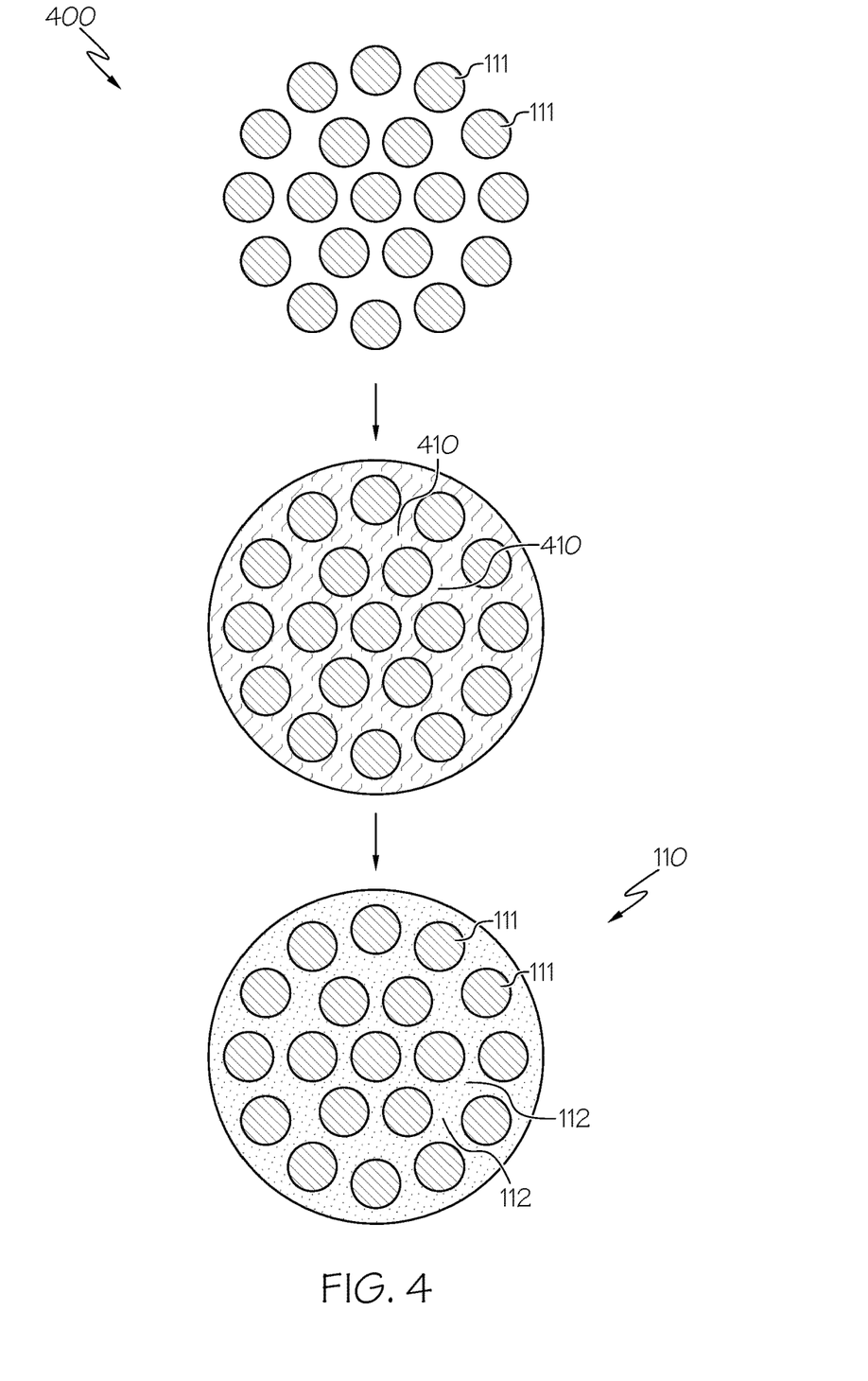
FIG. 4 schematically depicts a self-reinforcing step, according to one or more embodiments described in this disclosure.

With reference now to FIG. 4, in the self-reinforcing step 400, the UHMWPE fibers 111 are compacted and heated to a temperature around their melting point, which causes the UHMWPE fibers 111 to partially melt and provide a molten UHMWPE matrix 410. Upon cooling, the molten UHMWPE matrix 410 hardens to provide the core 110 as a SRC.

In initial hot die 310, the UHMWPE fibers 111 may be heated to a temperature that is approximate to the melting point of the UHMWPE fibers 111. In embodiments, the UHMWPE fibers 111 may be heated to a temperature of between 100° C. and 200° C., between 110° C. and 190° C., between 120° C. and 180° C., between 125° C. and 175° C., between 130° C. and 165° C., between 135° C. and 160° C., or between 140° C. and 155° C. in initial hot die 310. In embodiments, the UHMWPE fibers 111 may be exposed to a pressure of between 0.1 MPa and 500 MPa, between 0.5 MPa and 100 MPa, between 1.0 MPa and 70 MPa, between 10 MPa and 65 MPa, or between 40 MPa and 60 MPa in initial hot die 310. After exiting initial hot die 310, the self-reinforced UHMWPE core 110 may be further processed into a reinforcing bar 100 consisting of UHMWPE in the manner depicted in FIG. 3.

Referring back to FIG. 3, upon exiting initial hot die 310, the core 110 is continuously wrapped in UHMWPE tape 121 and then pulled through second guide 260 followed by binding hot die 270 to provide the reinforcing bar 100. The reinforcing bar 100 is cut to the appropriate length using cutter 380. When compared to the first process described above (which made reference to FIG. 2), the second process 300 does not include a resin impregnation step.

In embodiments of the second process 300, binding hot die 270 may be may be heated to a temperature that is approximate to the melting point of the UHMWPE fibers 111. As such, in embodiments of the second process 300, binding hot die 270 may advantageously fuse the layers of UHMWPE tape 121 and fuse the shell 120 to the core 110. Thus, in the second process 300, binding hot die 270 may be heated to a temperature of between 100° C. and 200° C., between 110° C. and 190° C., between 120° C. and 180° C., between 125° C. and 175° C., between 130° C. and 165° C., between 135° C. and 160° C., or between 140° C. and 155° C.

Reinforcing bars according to embodiments described herein may have superior mechanical properties compared with existing reinforcing bars. Reinforcing bars described herein may be 2 to 3 times stiffer than commercial glass fiber reinforced polymer (FRP) reinforcing bars. Reinforcing bars according to embodiments described herein may have a tensile strength 2 to 3 times greater than commercial glass FRP reinforcing bars and a tensile strength about 5 times greater than steel reinforcing bars. Reinforcing bars according to embodiments described herein may have a specific stiffness equivalent to carbon FRP rebar, which is 6 times greater than glass FRP rebar, but reinforcing bars according to embodiments disclosed herein are cheaper and require less energy to produce than FRP, are recyclable (unlike FRP), and may be bent on site. Therefore, the reinforcing bars according to embodiments may be particularly attractive for use in lightweight building structures, such as skyscrapers, bridges, or mobile bridges.

Reinforcing bars according to embodiments described herein may have on-site bendability. Because of the easily accessible melting point of UHMWPE, reinforcing bars according to embodiments described herein may be thermoformed and bent upon application of heat and force on-site. Most FRP reinforcing bars cannot be bent after manufacture. Additionally, steel reinforcing bars can only be bent with the application of extreme heat, which may not be feasible on-site. Thus, the use of reinforcing bars according to embodiments described herein may lead to more versatility and reduced logistical burdens at some construction sites.

According to one or more embodiments, the use of reinforcing bars according to embodiments described herein may advantageously reduce transportation costs for construction projects. Reinforcing bars according to embodiments described herein may be less dense and have a higher specific strength and specific stiffness than steel and most FRP reinforcing bars. Therefore, the use of reinforcing bars according to embodiments described herein may lead to lighter shipping loads and thus, lower transportation costs.

The use of reinforcing bars according to embodiments described herein may lead to lower maintenance costs for structures. Reinforcing bars according to embodiments described herein may not corrode like steel reinforcing bars. Additionally, reinforcing bars according to embodiments described herein may be more immune to concrete's highly alkaline environment than glass FRP reinforcing bars and more immune to saline environments than aramid FRP reinforcing bars. Thus, reinforcing bars according to embodiments described herein may have a longer service life and require less maintenance than steel and FRP reinforcing bars.

Reinforcing bars according to embodiments described herein may be highly recyclable. Because reinforcing bars according to embodiments described may consist of polyethylene, which has an easily accessible melting point, recycling the reinforcing bars of embodiments may be simple. Recycling steel requires more energy because it has a much higher melting point. Recycling glass, aramid, and carbon FRP reinforcing bars requires the polymer matrix to be separated from the reinforcing fibers. Thus, recycling conventional FRP reinforcing bars may be far more complicated and energy intensive than recycling reinforcing bars according to embodiments described herein.

According to one or more embodiments, reinforcing bars according to embodiments described herein may have a much lower carbon footprint compared with conventional reinforcing bars. Reinforcing bars according to embodiments described herein may consist of polyethylene, which requires a much lower carbon intensity to produce compared with the more emissive materials of conventional reinforcing bars such as glass fiber, steel, carbon fiber, and thermoset resins.

Also provided is a supported structural material. The supported structural material comprises concrete and one or more of the reinforcing bars according to embodiments described herein. The one or more of the reinforcing bars according to embodiments described herein are embedded in the concrete. In embodiments, the reinforcing bars according to embodiments described herein may be embedded in the concrete using traditional concrete reinforcing techniques. In embodiments, the supported structural material may be formed by pouring concrete onto a pre-assembled lattice of reinforcing bars according to embodiments described herein and allowing the concrete to harden. In embodiments, the supported structural material may comprise asphalt concrete, Portland cement concrete, or polymer concrete.

According to an aspect, either alone or in combination with any other aspect, a reinforcing bar includes a core comprising ultra-high-molecular-weight polyethylene fibers aligned in an axial direction and a polyethylene matrix. The ultra-high-molecular-weight polyethylene fibers are bound in the polyethylene matrix. A shell including ultra-high-molecular-weight polyethylene tape surrounds the core in a radial dimension.

According to a second aspect, either alone or in combination with any other aspect, the polyethylene matrix comprises ultra-high-molecular-weight polyethylene.

According to a third aspect, either alone or in combination with any other aspect, the reinforcing bar consists of ultra-high-molecular-weight polyethylene.

According to a fourth aspect, either alone or in combination with any other aspect, the reinforcing bar has a diameter of at least 5 millimeters.

According to a fifth aspect, either alone or in combination with the fourth aspect, the reinforcing bar has a diameter of at least 10 millimeters.

According to a sixth aspect, either alone or in combination with any other aspect, the ultra-high-molecular-weight polyethylene fibers have a tensile strength that is between 0.5 GPa and 1.6 GPa greater than a tensile strength of the ultra-high-molecular-weight polyethylene tape.

According to a seventh aspect, either alone or in combination with any other aspect, the ultra-high-molecular-weight polyethylene fibers have a Young's modulus that is between 30 GPa and 45 GPa less than a Young's modulus of the ultra-high-molecular-weight polyethylene tape.

According to an eighth aspect, either alone or in combination with any other aspect, the reinforcing bar has a specific stiffness of between $75 \times 10^6$ m$^2$ s$^{-2}$ and $115 \times 10^6$ m$^2$ s$^{-2}$.

According to a ninth aspect, either alone or in combination with the eighth aspect, the reinforcing bar has a specific stiffness of between $100 \times 10^6$ m$^2$ s$^{-2}$ and $110 \times 10^6$ m$^2$ s$^{-2}$.

According to a tenth aspect, either alone or in combination with any other aspect, the reinforcing bar has a specific strength of between 1,700 kN·m/kg and 3,300 kN·m/kg.

According to an eleventh aspect, either alone or in combination with the tenth aspect, the reinforcing bar has a specific strength of between 2,000 kN·m/kg and 2,500 kN·m/kg.

According to a twelfth aspect, either alone or in combination with any other aspect, the reinforcing bar has a shear strength of between 0.14 GPa and 0.55 GPa.

According to a thirteenth aspect, either alone or in combination with the twelfth aspect, the reinforcing bar has a shear strength of between 0.30 GPa and 0.50 GPa.

According to a fourteenth aspect, either alone or in combination with any other aspect, the ultra-high-molecular-weight polyethylene tape is alternatively laid at an angle of between 20 degrees and 40 degrees with respect to the axis of the reinforcing bar.

According to a fifteenth aspect, either alone or in combination with any other aspect, a supported structure includes concrete and one or more of the reinforcing bars. The one or more reinforcing bars are embedded in the concrete.

According to a sixteenth aspect, either alone or in combination with any other aspect, a process for manufacturing one or more ultra-high-molecular-weight polyethylene reinforcing bars includes aligning a plurality of ultra-high-molecular-weight polyethylene fibers in an axial direction; partially melting the plurality of ultra-high-molecular-weight polyethylene fibers by applying heat and pressure to the plurality of ultra-high-molecular-weight polyethylene fibers; cooling the plurality of ultra-high-molecular-weight polyethylene fibers to form a core comprising the plurality of ultra-high-molecular-weight polyethylene fibers and a ultra-high-molecular-weight polyethylene matrix, the plurality of ultra-high-molecular-weight polyethylene fibers bound in the ultra-high-molecular-weight polyethylene matrix; and applying an ultra-high-molecular-weight polyethylene tape to the surface of the core.

According to a seventeenth aspect, either alone or in combination with any other aspect, the heat that is applied is at a temperature of between 110° C. to 190° C. in the process.

According to an eighteenth aspect, either alone or in combination with any other aspect, the pressure that is applied is between 10 MPa and 65 MPa in the process.

According to a nineteenth aspect, either alone or in combination with any other aspect, the plurality of ultra-high-molecular-weight polyethylene fibers have a tensile strength that is between 0.5 GPa and 1.6 GPa greater than a tensile strength of the ultra-high-molecular-weight polyethylene tape in the process.

According to a twentieth aspect, either alone or in combination with any other aspect, the plurality of ultra-high-molecular-weight polyethylene fibers have a Young's modulus that is between 30 GPa and 45 GPa less than a Young's modulus of the ultra-high-molecular-weight polyethylene tape in the process.

EXAMPLES

The various embodiments of the reinforcing bars according to embodiments will be further clarified by the following examples. The examples are illustrative in nature, and should not be understood to limit the subject matter of the present disclosure. The mechanical properties in the following examples were predicted using mean field homogenization on Digimat after inputting the desired parameters of reinforcing bar compositions according to embodiments of the present disclosure. The reinforcing bars provided in the following examples were compared with the minimum requirements of the ASTM D7957 standard, which is the standard specification for solid round glass fiber reinforced polymer bars for concrete reinforcement.

Example 1

Example 1 provides the effect of different shell orientations with respect to the bar axis on mechanical properties of reinforcing bars consisting of ultra-high-molecular-weight polyethylene (UHMWPE). The reinforcing bars have an overall diameter of 10 mm, a density of 970 kg/m$^3$, and a maximum service temperature of 100° C.

TABLE 1

Effect of shell orientation on mechanical properties of UHMWPE reinforcing bars

| Sample # | Core diameter (mm) | Shell thickness (mm) | Shell orientation (degrees) | Young's modulus (GPa) | Tensile strength (GPa) | Shear strength (GPa) | Elongation at Break (%) |
|---|---|---|---|---|---|---|---|
| 1 | 6 | 2 | 30 | 105 | 2.375 | 0.38 | 2.3 |
| 2 | | | 45 | 82 | 1.9 | 0.41 | 2.0 |
| 3 | | | 60 | 73 | 1.65 | 0.38 | 2.3 |
| 4 | 9 | 0.5 | 30 | 106 | 2.4 | 0.15 | 2.3 |
| 5 | | | 45 | 101 | 2.25 | 0.15 | 2.0 |
| 6 | | | 60 | 97 | 2.2 | 0.15 | 2.3 |
| Minimum requirement from ASTM D7957 | | | | 44.8 | 0.8 | 0.131 | 1.1 |

Example 2

Example 2 provides the effect of reinforcing bar diameter on the tensile strength and shear strength of the reinforcing bar. The reinforcing bars provided in Table 2 consist of UHMWPE and have a shell orientation at 30 degrees with respect to the bar axis.

TABLE 2

Effect of bar diameter on mechanical properties of UHMWPE reinforcing bars

| Sample # | 1 | 2 | 3 | 4 | 5 | 6 | 7 | 8 | 9 |
|---|---|---|---|---|---|---|---|---|---|
| Nominal Rebar Diameter (mm) | 6.3 | 9.5 | 12.7 | 15.9 | 19.1 | 22.2 | 25.4 | 28.7 | 32.3 |
| Nominal Core Diameter (mm) | 3.78 | 5.7 | 7.62 | 9.54 | 11.46 | 14 | 17.2 | 20.5 | 24.1 |
| Nominal Shell thickness (mm) | 1.26 | 1.9 | 2.54 | 3.18 | 3.82 | 4.1 | 4.1 | 4.1 | 4.1 |
| Tensile Strength (ASTM 7957) (MPa) | 844 | 831 | 744 | 653 | 641 | 623 | 582 | 566 | 534 |
| Shear strength (ASTM 7957) (MPa) | 131 | 131 | 131 | 131 | 131 | 131 | 131 | 131 | 131 |
| Tensile Strength (UHMWPE Rebar) (MPa) | 2375 | 2375 | 2375 | 2375 | 2375 | 2378 | 2381 | 2384 | 2387 |
| Shear strength (UHMWPE Rebar) (MPa) | 380 | 380 | 380 | 380 | 380 | 369 | 348 | 318 | 284 |

The data in Table 1 suggests that as the shell orientation deviates from the bar axis (increasing angle), the Young's modulus and tensile strength of the reinforcing bar decreases. The shear strength and elongation at break of the reinforcing bar appeared to be unaffected by shell orientation. As such, a smaller angle shell orientation appeared to result in beneficial mechanical properties.

Also, the data in Table 1 revealed that a larger core diameter with a thinner shell provides a reinforcing bar with a higher Young's modulus and tensile strength but a lower shear strength compared with a reinforcing bar that has a thicker shell and smaller core diameter. Elongation at break appears to be unaffected. The trend of increasing tensile strength and decreasing shear strength with decreasing relative shell thickness was also apparent from the data in Table 2. Thus, there appeared to be a tradeoff in mechanical properties when the relative thickness of the core and shell are varied. The Table 2 data also revealed that tensile strength and shear strength remained constant with increasing bar diameter as long as the relative thickness of the core and shell are maintained. Although the ASTM D7957 maintains a constant shear strength requirement, the tensile strength requirements decrease with increasing bar diameter.

All of the UHMWPE reinforcing bars in Tables 1 and 2 provided vastly superior mechanical properties to the ASTM D7957 standard. The Table 1 UHMWPE reinforcing bars provided a Young's modulus ranging from about 1.5 to 2.5 times higher, a tensile strength of about 2 to 3 times higher, a shear strength of about 1.1 to 2.9 times higher, and an elongation at break of about 2 times higher than the standard. When the shell orientation is optimized at 30 degrees with respect to the bar axis as in Table 2, reinforcing bars according to embodiments provide superior mechanical properties. Thus, the reinforcing bars according to embodiments easily meet the standard for concrete reinforcement.

It should be understood that any ranges provided herein include the endpoints unless stated otherwise.

It should be understood that any two quantitative values assigned to a property may constitute a range of that property, and all combinations of ranges formed from all stated quantitative values of a given property are contemplated in this disclosure.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A reinforcing bar comprising:
   a core comprising ultra-high-molecular-weight polyethylene fibers aligned in an axial direction and a polyethylene matrix, wherein the ultra-high-molecular-weight polyethylene fibers are bound in the polyethylene matrix; and
   a shell comprising ultra-high-molecular-weight polyethylene tape surrounding the core in a radial dimension.

2. The reinforcing bar of claim 1, wherein the polyethylene matrix comprises ultra-high-molecular-weight polyethylene.

3. The reinforcing bar of claim 1, wherein
   the core consists of ultra-high-molecular-weight polyethylene fibers,
   the polyethylene matrix consists of ultra-high-molecular-weight polyethylene, and
   the shell consists of ultra-high-molecular-weight polyethylene tape.

4. The reinforcing bar of claim 1, wherein the reinforcing bar has a diameter of at least 5 millimeters.

5. The reinforcing bar of claim 4, wherein the reinforcing bar has a diameter of at least 10 millimeters.

6. The reinforcing bar of claim 1, wherein the ultra-high-molecular-weight polyethylene fibers have a tensile strength that is between 0.5 GPa and 1.6 GPa greater than a tensile strength of the ultra-high-molecular-weight polyethylene tape.

7. The reinforcing bar of claim 1, wherein the ultra-high-molecular-weight polyethylene fibers have a Young's modulus that is between 30 GPa and 45 GPa less than a Young's modulus of the ultra-high-molecular-weight polyethylene tape.

8. The reinforcing bar of claim 1, wherein the reinforcing bar has a specific stiffness of between $75 \times 10^6$ $m^2$ $s^{-2}$ and $115 \times 10^6$ $m^2$ $s^{-2}$.

9. The reinforcing bar of claim 8, wherein the reinforcing bar has a specific stiffness of between $100 \times 10^6$ $m^2$ $s^{-2}$ and $110 \times 10^6$ $m^2$ $s^{-2}$.

10. The reinforcing bar of claim 1, wherein the reinforcing bar has a specific strength of between 1,700 kN·m/kg and 3,300 kN·m/kg.

11. The reinforcing bar of claim 10, wherein the reinforcing bar has a specific strength of between 2,000 kN·m/kg and 2,500 kN·m/kg.

12. The reinforcing bar of claim 1, wherein the reinforcing bar has a shear strength of between 0.14 GPa and 0.55 GPa.

13. The reinforcing bar of claim 12, wherein the reinforcing bar has a shear strength of between 0.30 GPa and 0.50 GPa.

14. The reinforcing bar of claim 1, wherein the ultra-high-molecular-weight polyethylene tape is alternatively laid at an angle of between 20 degrees and 40 degrees with respect to the axis of the reinforcing bar.

15. A supported structure comprising concrete and one or more reinforcing bars according to claim 1, wherein the one or more reinforcing bars are embedded in the concrete.

16. A process for manufacturing one or more ultra-high-molecular-weight polyethylene reinforcing bars comprising:
   aligning a plurality of ultra-high-molecular-weight polyethylene fibers in an axial direction;
   partially melting the plurality of ultra-high-molecular-weight polyethylene fibers by applying heat and pressure to the plurality of ultra-high-molecular-weight polyethylene fibers;
   cooling the plurality of ultra-high-molecular-weight polyethylene fibers to form a core comprising the plurality of ultra-high-molecular-weight polyethylene fibers and a ultra-high-molecular-weight polyethylene matrix, the plurality of ultra-high-molecular-weight polyethylene fibers bound in the ultra-high-molecular-weight polyethylene matrix; and
   applying an ultra-high-molecular-weight polyethylene tape to the surface of the core.

17. The process of claim 16, wherein the heat that is applied is at a temperature of between 110° C. to 190° C.

18. The process of claim 16, wherein the pressure that is applied is between 10 MPa and 65 MPa.

19. The process of claim 16, wherein the plurality of ultra-high-molecular-weight polyethylene fibers have a tensile strength that is between 0.5 GPa and 1.6 GPa greater than a tensile strength of the ultra-high-molecular-weight polyethylene tape.

20. The process of claim 16, wherein the plurality of ultra-high-molecular-weight polyethylene fibers have a Young's modulus that is between 30 GPa and 45 GPa less than a Young's modulus of the ultra-high-molecular-weight polyethylene tape.

* * * * *